US007398235B1

(12) United States Patent
Westrick

(10) Patent No.: US 7,398,235 B1
(45) Date of Patent: Jul. 8, 2008

(54) SYSTEM FOR ADMINISTERING AN ON-LINE FINANCIAL-AID SERVICE FOR A PLURALITY OF POST-HIGHSCHOOL EDUCATION FACILITIES

(75) Inventor: Greg S. Westrick, Fairfield, OH (US)

(73) Assignee: Student Loan Funding Resources, Cincinnati, OH (US)

( * ) Notice: Subject to any disclaimer, the term of this patent is extended or adjusted under 35 U.S.C. 154(b) by 1188 days.

(21) Appl. No.: 09/711,671

(22) Filed: Nov. 13, 2000

Related U.S. Application Data

(60) Provisional application No. 60/165,065, filed on Nov. 12, 1999.

(51) Int. Cl.
*G06Q 40/00* (2006.01)
(52) U.S. Cl. .......................................... 705/35; 705/38
(58) Field of Classification Search .............. 705/35, 705/36, 38, 1; 707/1; 715/513, 530, 500; 434/118
See application file for complete search history.

(56) References Cited

U.S. PATENT DOCUMENTS

| | | | | |
|---|---|---|---|---|
| 5,404,294 | A * | 4/1995 | Karnik ........................ | 715/507 |
| 5,745,885 | A * | 4/1998 | Mottola et al. ................ | 705/38 |
| 6,385,594 | B1 * | 5/2002 | Lebda et al. .................. | 705/38 |
| 6,424,952 | B1 * | 7/2002 | Yinbal .......................... | 705/36 |
| 2002/0028426 | A1 * | 3/2002 | Pasant ......................... | 434/118 |

FOREIGN PATENT DOCUMENTS

| | | | |
|---|---|---|---|
| WO | WO 99/30261 | * | 6/1999 |
| WO | WO 99/63454 | * | 6/1999 |
| WO | WO 01/08030 | * | 2/2001 |

OTHER PUBLICATIONS

PR Newswire; "Web Site Guides Users Through Fundamentals of College Financing"; Sep. 9, 1998; pp. 1-2.*

(Continued)

*Primary Examiner*—Ella Colbert
(74) *Attorney, Agent, or Firm*—Thompson Hine LLP

(57) ABSTRACT

A system for administering an on-line financial-aid service for a plurality of post-highschool education facilities includes a centralized computer, a plurality of school computer servers for a plurality of post-highschool education facilities and at least one user computer of a borrower. Each school computer server includes a Web-site software program providing a graphical user interface representing a Web-site for the respective post-highschool education facility on the computer network, including an address link for connecting the user computer to the centralized computer server. The centralized computer server includes a financial-aid-service software program providing a school-access graphical user interface accessible by each of the post-highschool education facilities and a student-access customizable graphical user interface for each of the post-highschool education facilities, accessible by the borrower. The school-access graphical user interface enables a given post-highschool education facility to establish an account that causes the financial-aid-service software program to enable customization of the corresponding student-access graphical user interface for the given post-highschool education facility.

31 Claims, 18 Drawing Sheets

OTHER PUBLICATIONS

Figure 1:
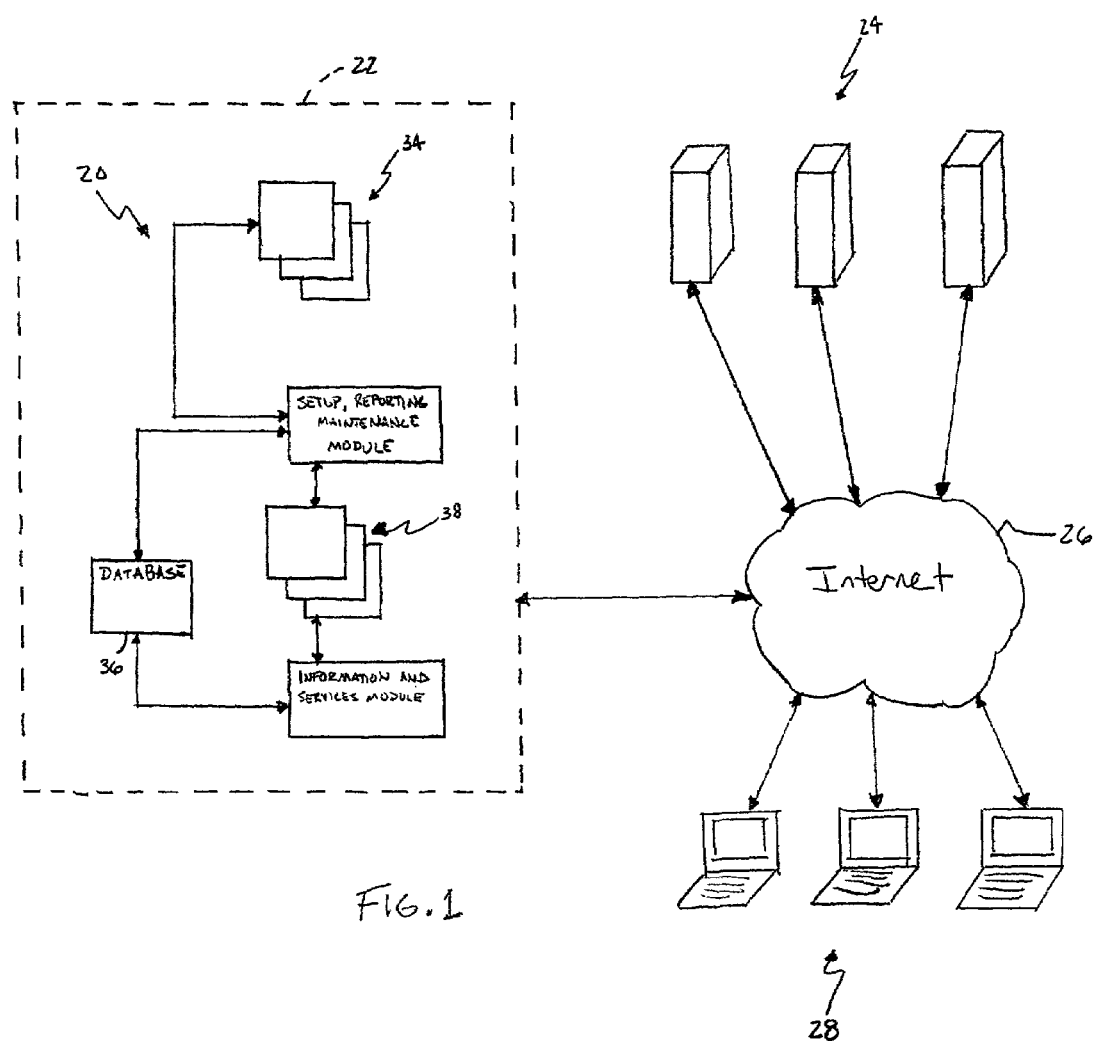

PR Newswire; "Laureate (SM), Sallie Mae's New Internet-Based Student Loan Management System, Is Officially 'Live'"; Jul. 1, 1999; pp. 1-2.*

"SNAP Technologies, Makers of CollegeEdge, Honored by CIO Magazine as one of the Top 50 Internet/Intranet Sites"; PR Newswire; Jul. 1, 1999; pp. 1 and 2.*

"YouthStream: Web's Largest Scholarship Search Database Now Available to Millions of College Students Via mybytes.com"; Business Wire; Oct. 4, 1999; pp. 1 and 2.*

Leider, Anna; Journal of Financial Planning; V8n2; Apr. 1995; pp. 1-17.*

* cited by examiner

Student Loan Funding Your.studentloanfunding.com℠

Test School ~56

Registration & Enrollment Information

You Have Enrolled in the Following Services: ~58
- Your StudentLoanFunding.com

You Can Enroll in the Following Services: 60
- Your eNewsletter 62
- Your electronicAward 64
- Your Jump Start PLUS Application with Pre-approval 66
- Your eCounselor 68

Return to Your Studentloanfunding.com Home

~47

FIG. 4

---

Student Loan Funding Your.studentloanfunding.com℠

Test School ~56

Your eNewsletter

Enrollment Information: Modify Contact Information ~74
Subscriber Administration: Add or Modify Subscriber Information ~76
Message Administration: Create, Customize, and/or Preview Newsletters/Messages ~78
Reports Administration: View Detailed Subscriber Reports ~80

Return to Registration and Enrollment

~70

FIG. 5

Your eNewsletter Enrollment Information

Contact Information
Please provide contact information for the individual who will be managing Your eNewlsetter.

*Items with an * must be completed for your enrollment to be processed.*

First Name:* _____
Last Name:* _____
Title: _____
Phone:* 555-555-555
Email:* _____

Website Information:* Since students will be able to subscribe to the newsletter from your website, please provide us with the web address where you'd like your students to return after completing the subscription process (eg: www.youruniversity.edu).
http:// _____

CC Email Addresses: (Separate by semi-colons)
Please provide the email address of any individual(s) on your school's staff who should receive notices of available Student Loan Funding Newsletters and copies of sent customized newsletters, or school created messages.

To learn how you can add an eNewsletter link to your school's website click here. —88

Submit Enrollment Information: [ Enroll ] —90

Return to Registration and Enrollment without enrolling

FIG. 6

Test School

Customize Student Loan Funding's Periodic eNewsletter

The eNewsletter(s) shown below are available for customization. To customize, view or modify a newsletter's contents and recipients, click on a newsletter subject.

An eNewsletter with a newsletter status of "Send Newsletter" will be sent to students (recipients) on the stated delivery date. To keep a newsletter from being sent, simply change the newsletter status to "Do NOT Send Newsletter".

| Delivery Date | Newsletter Subject | Newsletter Status |
|---|---|---|
| 11-11-2000 | College Fresh and Sophomore | Send Newsletter |
| 11-14-2000 | Send Custom and Don't Send | Send Newsletter |
| 11-21-2000 | Testing Don't send | Send Newsletter |
| 11-24-2000 | Don't send and Send test | Send Newsletter |
| 11-30-2000 | College Freshmen Notify | Send Newsletter |
| 12-09-2000 | Pros Coll Student, Fresh and Soph (again & again) | Send Newsletter |
| 12-10-2000 | Prosp. College Student NewsLetter | Send Newsletter |
| 12-11-2000 | Fresh and Soph test (again) | Send Newsletter |
| 12-14-2000 | Fresh and Soph with Custom | Send Newsletter |
| 12-24-2000 | College Freshmen NewsLetter | Send Newsletter |

Return to Message Administration Menu

FIG. 8

Test School ~56

Create Custom Content

The Delivery Date of this eNewsletter is set by Student Loan Funding and cannot be changed.

Delivery Date:*    11-11-2000  ~120

Please specify the recipients of this customized Newsletter by selecting their grade level/catagory.

Note: All subscribers assigned to the following grade levels/catagories will receive the non-customized version of this Newsletter, unless you a) select them to receive a customized version, or
    b) change this Newsletter's status to "Do NOT Send Newsletter"

Newsletter Recipients:*  ☑ College Freshman
                    ☑ College Sophomore   }~116

~111

The subject of this Newsletter may be changed to reflect your custom content.

Newsletter Subject:*  College Fresh and Sophomore  ~114

This portion of the Newsletter cannot be changed, modified or deleted.

Fixed Newsletter Content:  testing newsletter to college freshmen and sophomore  ~122

You may customize this Newsletter by entering school-specific information here:

Custom Text:*  ~118

This Newsletter can be modified up to one day prior to the specified delivery date.

Customize eNewsletter:  [ Send  ~124

Return to eNewsletter's Available for Customization

FIG. 9

Student Loan Funding Your studentloanfunding.com℠

Message Added Successfully!

Subject: Cool stuff you should know

Message: testing newsletter to college freshmen and sophomore custom content

Student Loan Funding - your education funding resource!

Return to eNewsletter's Available for Customization

FIG. 10

Student Loan Funding Your studentloanfunding.com℠

Test School eNewsletter Subscribers by Grade Level

College Freshman        2

TOTAL SUBSCRIBERS: 2

To view a more detailed report based on subscriber's grade level, click here.

Return to Reports Administration Menu

FIG. 11

Your eCounselor℠ Enrollment Information

Contact Information
Please provide contact information for the individual who will be managing Your eCounselor.

*Items with an * must be completed for your enrollment to be processed.*

132 {
- First Name:* Kris
- Last Name:* Test
- Title:
- School Address:* Test School
- City:*
- State:*
- Zipcode:*
- Phone:*
- Email:*
}

Customization — 134

Website Information:* Since you will be able to provide a link from your web site directly into Your eCounselor, tell us where to return your students after they complete the counseling session.
(e.g. www.youruniversity.edu/financialaidpage.html)

Notification Method:* ~136
All students who have successfully completed a counseling session will appear on your school's electronic roster. In addition to the electronic roster, you can require that students print out a certificate and submit it to you, you can have an email sent to you, or you can opt to use all three notification methods.

130 eNewsletter Subscription Method:*
You can automatically enroll all eCounselor students in Your eNewsletter by selecting "Automatic." Or select "Prompt" to ask students during the eCounseling session if they would like to subscribe to the Your eNewsletter service. By selecting "None", Your eNewsletter will not be mentioned during the eCounseling session.

Loan Program Type:* ~138
To ensure that the correct eCounseling session is presented to your students, please indicate if your school participates in the FFEL Program, the Direct Loan Program or both programs.

Notification Office:
If you selected "Paper" as a method of notification, what is the name of the office where students will take their paper certificate indicating completion of the eCounseling session? (e.g. The Bursar's Office)

146

Notification Address:
If you selected "Paper" as a method of notification, what is the address of the office where students should go to submit their counseling certificate? (e.g. University Hall - Room 1)

Notification Email: ~142
If you selected "Email" as a method of notification, what is the email address where notifications of completed loan counseling sessions should be sent?

CC Email Addresses:

(separate by semi-colons)
Please provide the email address of any individual(s) on your school's staff who should receive notification of students completing an eCounseling session.

FAO Office:*
What is the name of the financial aid office at your school? For instance, some schools have an "Office of Financial Aid" while others have a "Financial Aid Office".

FAO Phone:*
What is the area code, phone number and extension of the financial aid office?

FIG. 12

Test School

Entrance Counseling Enrollment Information

To offer your students entrance counseling, simply select your preferred test method.

Test Method: During Session and At End ▼ — 146

Establish a Link to Entrance Counseling from Your School's Website:
In order to achieve the best use of this service, we strongly recommend that you provide a direct link to Your eCounselor from your school's website. To establish a link, simply cut and paste the HTML listed below onto your site. Please remember to replace the x's with your 6 digit DOE number. ~144

Text Link:
`<a href="http://your.studentloanfunding.com/eCounUser?sch_id=XXXXXX&tut_type=ent" alt="Your eCounselor">Entrance Counseling</a>`

Graphic Link:
This image will appear on your school's page using the HTML found below.

`<a href="http://your.studentloanfunding.com/eCounUser?sch_id=XXXXXX&tut_type=ent" alt="Your eCounselor"> <img src="http://your.studentloanfunding.com/images/ecoun_entrance.gif" alt="Your Ecounselor - ENTRANCE" width="120" height="60" border="0"></a>`

Enroll in Entrance Counseling: Enroll — 148

Return to Tutorial Administration Main Menu

Your studentloanfunding.com | Privacy Policy | Comments/Questions?

FIG. 13

Add/Modify Custom Content to a Topic

The "Title" & "Required Topic Contents" sections cannot be altered. However, custom content can be added to this topic by proceeding to the "School's Custom Content" section below.

Topic Title: Go For The Gold!

Required Topic Contents:

As a potential student loan borrower, getting all the information you need is a challenge worthy of an Olympic contender. And like every contender, you have a support team to stand behind you – to cheer you on and get you on your way.

But who makes up your team?

First off, as the loan borrower, you are key to the loan process. Without you, there would be no loan. When you take out a student loan, other agencies, organizations, and support the making, disbursing, and collecting of your student loan. A quick review of "who's who" will help you know who can assist you during the student loan process.

The U.S. Department of Education is a Federal agency that administers many financial aid programs including Federal student loans.

Your School determines the amount you are eligible to borrow, based on the estimated cost of attendance and the financial aid you will receive. Your school certifies that you are a student and meet all eligibility criteria for borrowing.

Lenders, banks, credit unions, savings and loan associations, state agencies, and the federal government, make Federal student loans. Because Stafford and PLUS Loans are federally regulated, lenders offer the same basic loan terms. But, lenders can provide different services to benefit their borrowers. For example, some lenders will reduce a loan's interest rate if monthly payments are made on time.

Guarantors provide payment guarantees to lenders for the Stafford and PLUS Loan programs. If a student does not repay a loan, the guarantor will pay the lender and take over collection of the loan on behalf the U.S. Department of Education.

Servicers manage student loans for lenders by disbursing your loan funds to the school, sending you information and statements about your loan and collecting your monthly payments. Some lenders act as their own servicers, while others contract with companies that specialize in servicing student borrowers.

Secondary Markets buy student loans from lenders to provide the lenders with more funds to lend to other students needing aid. Not every lender sells it loans. If your loan is sold, you will be notified by mail and given information about the new holder of the loan.

Holders are the companies or agencies that own the loans. The lender is the holder on your loan unless it is sold to a secondary market or taken over by a guarantee agency. Then that entity will become the holder of your loan.

If you ever have a dispute over your loan, your Student Loan Ombudsman can help. The Ombudsman is an office within the U.S. Department of Education that works with student loan borrowers to informally resolve federal loan disputes and problems. These loans would include Federal Stafford, PLUS, and Consolidated Loans in both the Federal Family Education Loan and the Direct Loan programs, Federal Perkins Loans, and the predecessors to these programs (including Guaranteed Student Loans, SLS Loans, and NDSL Loans). The Ombudsman Customer Service number is 1-877-557-2575.

School Custom Content

To add/modify custom content for this topic, type your text in the box below. Text which requires formatting, i.e. bullets, charts, graphs, italicizing, bolding, etc., must be entered in HTML code rather than straight type.

Most word processing programs today allow users to save documents as HTML. It is a very simple process which does not require knowledge of HTML. For assistance contact your personal Student Loan Funding representative or call us toll-free at 1-877-477-7537 extension 200.

Custom Content:

Content Positioning Within the Tutorial: Bottom of the Page

Modify   Reset Fields

Return to Tutorial Content Administration

FIG. 14

Your Jump Start Plus℠ Pre-Approval Enrollment Information

Contact Information
Please provide contact information for the individual who will be managing Your Jump Start PLUS Application with Pre-Approval.

*Items with an \* must be completed for your enrollment to be processed.*

- First Name:*
- Last Name:*
- Title:
- Phone:*
- Email:*

Preferred Guarantor/Originator:*   [Please Choose ▼]

Web Site Information:*   Since you will be able to provide a link from your web site directly into the Your Jump Start PLUS service, tell us where to return your parents after they complete the pre-approval process. (e.g. www.youruniversity.edu/financialaidpage.html)
http://

Credit Decision Notification Method:*   This determines how you will receive notification of a parent's approval/denial status.
[▼]

Application/Certification Method:*
Please read and select your preferred processing method from the three choices below:

○ After an application and qualified pre-approval is performed by, or on behalf of, the parent, SLF will send the parent a pre-printed application with instructions to complete, sign and return the application directly to your preferred Guarantor/Originator. You will then certify the loan electronically. [P/E]

◉ After an application and qualified pre-approval is performed by, or on behalf of, the parent, SLF will inform the parent that an electronic notification has been sent to you and that you will initiate the application process. You will send your preferred guarantor/originator the parent's information. You will certify the loan electronically and then the guarantor/originator will mail a pre-printed loan application to the parent for their review and signature. [E/E]

○ After an application and qualified pre-approval is performed by, or on behalf of, the parent, SLF will send the parent a pre-printed application with instructions to complete, sign, and return the application to you. You will certify the loan and then forward the application to your preferred guarantor/originator for additional processing. [P/P]

FIG. 16

Your Electronic Award Enrollment Information

Contact Information
Please provide contact information for the individual who will be managing Your Electronic Award

*Items with an * must be completed for your enrollment to be processed.*

First Name:*
Last Name:*
Title:
Phone:*
Email:*

} 186

CC Email Addresses:

(Separate by semi-colons)
Please provide the email address of any individual(s) on your school's staff who should receive notices of Your Electronic Award communications.

184

Customization

School Email Address: ———— 188
The email address students will use for Award questions.

Student Reminder Email:
Would you like an email reminder to be sent to the students who did not open their Electronic Award?
○ Yes ←— 190
● No
←— 192
[1 ▼] If yes, after how many days? ———— 194

Website Information:
Students will be able to access your website by clicking on your school logo and through a "Go to..." link at the bottom of the Award. Please provide the address (URL) for these links (e.g. www.youruniversity.edu).

Stafford Loan Link:
Would you like to provide students who are awarded a Federal Stafford Loan a link to Student Loan Funding's online Stafford Loan application?
○ Yes ←— 196
● No Plus Loan Link:
Would you like to provide students who are awarded a Federal PLUS Loan loan a link to Student Loan Funding's online Jump Start PLUS pre-approval.
○ Yes ←— 198
● No Submit Enrollment Information: [ Submit ] ———— 200

Return to Registration & Enrollment without Enrolling

| Search | Glossary | Privacy Policy | Copyright Info | About Student Loan Funding |

FIG. 20 description. This is where you would see your description.

★5 ␣ ★5 <u>Budget and Assumptions Used to Calculate Award</u>

| | |
|---|---|
| College: UVC | Estimate Tuition: $ |
| State of Residency: OH | Estimated Housing/Meals: $ |
| Enrollment: Full-Time | Estimated Miscellaneous Costs: $ |

Living Arrangement: University Residence Hall

★6 ␣ ★6 <u>Financial Aid Award Information</u>

| Accept | Decline | Modify | | Summer | Autumn | Winter | Spring | TOTAL |
|---|---|---|---|---|---|---|---|---|
| ␣ | ␣ | ␣ | Estimated State Grant | $0 | $358 | $358 | $358 | $1074 |
| ␣ | | ␣ | Federal SEOG | $0 | $200 | $200 | $200 | $600 |
| ␣ | ␣ | | Federal Work-Study | $0 | $667 | $667 | $666 | $2000 |
| ␣ | | ␣ | Federal Perkins Loan | $0 | $667 | $667 | $666 | $2000 |
| ␣ | ␣ | ␣ | Federal Subsidized | $0 | $667 | $667 | $666 | $2000 |
| | | | TOTAL | $0 | $3400 | $3400 | $3399 | $10199 |

Please click on the above award(s) for a detailed description of each award. For a full glossary of all awards, c ★7 ␣ ★7 <u>Additional Text Section</u>

This is where you would see your description This is where you would see your description This is where you would see your description ★8 ␣ ★8 <u>Student-Specific Section</u>

This is where you would see your description This is where you would see your description This is where you would see your description ★9 ␣ ★9 <u>Additional Text Section</u>

This is where you would see your description This is where you would see your description This is where you would see your description ★10 ␣ ★10 <u>Your Signature Section</u>

Sincerely,

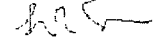

Gregory R. Smith
Director of Financial Aid

★11 ␣ ★11 <u>Link Section</u>

This is where you would see your description This is where you would see your description This is where you would see your description

FIG. 21B

SYSTEM FOR ADMINISTERING AN ON-LINE FINANCIAL-AID SERVICE FOR A PLURALITY OF POST-HIGHSCHOOL EDUCATION FACILITIES

CROSS-REFERENCE TO RELATED APPLICATIONS

The present application claims priority under 35 U.S.C. §119 from U.S. Provisional Patent Application Ser. No. 60/165,065, filed Nov. 12, 1999, the entire disclosure of which is incorporated herein by reference.

BACKGROUND

The present application is directed to a system and method for administering financial-aid information and services to potential and existing students of post-highschool education facilities and/or their parents, and more particularly, to a system and method for administering financial-aid information to such parties, where the content and operation of the system and method are customizable by the post-highschool education facilities that utilize the system and method of the present application.

Internet users over the age of 16 in the United States and Canada have reached numbers in excess of 90-million the date of this application. Therefore, it is clear that Internet access is becoming universal. Parents and potential students are increasingly using the Internet to communicate and research topics of interest. In fact, 77% of parents polled in a recent research study by the applicant had indicated that they would be interested in obtaining information about financial-aid for post-high school education facilities over the Internet. Additionally, students are increasingly using the Internet while at college. At the time of the present application, 80% of all college students own computers and 60% of all college students check or browse the World Wide Web daily.

It is clear, therefore, that parents and potential students are increasingly using the Internet to research colleges as their first research stop. As a result, most colleges and universities include their own Website on the Internet, from which parents and potential students can find virtually anything they need to know about the institution. It is obvious that parents and potential students will begin to expect that colleges and universities to include a dynamic Internet site that provides financial-aid information and services to the students.

A problem with this expectation is that many financial-aid offices of universities and colleges do not include the substantial time, money and resources involved with creating such a dynamic Web-based financial-aid information and service product.

SUMMARY

The present invention provides a customizable Web-based solution for universities and colleges wishing to have a dynamic Web-site to provide financial-aid information and services to potential students and their parents, as well as existing students and their parents. The invention is designed to integrate with the school's existing Website and processes, and is also robust to meet evolving needs of the school and families of the students. Additionally, the invention provides numerous reporting capabilities in a down loadable or printable format to the schools, to help the schools easily incorporate and process financial-aid records obtained by the invention.

A first aspect of the present invention provides a system for administering an on-line financial-aid service for a plurality of post-highschool education facilities that comprises: a centralized computer server operatively coupled to school computer servers for a plurality of post-highschool education facilities via a computer network, where the computer network is operatively coupled to at least one computer of a prospective student, an existing student, or a parent of a prospective or existing student. Each school computer server includes a software program providing a graphical user interface (such as an HTML file(s)) representing a home page or Website for the respective post-highschool education facility, where the Web site includes an address link (such as a hyperlink) for connecting the user's computer to the centralized computer server. The centralized computer server includes a software program providing a school-access graphical user interface accessible by each of the post-highschool education facilities, and a student-access customizable graphical user interface for each of the post-highschool education facilities, accessible by the borrower. The school-access graphical user interface provides at least one on-line form that includes fields for customizing the content and operation of the corresponding student-access graphical user interface. Each student-access graphical user interface provides at least financial-aid information (and, preferably, financial-aid services) to the borrower that includes the customized content and operation defined using the on-line form of the school-access graphical user interface.

Another aspect of the present invention is to provide a method for administering a financial-aid service to a post-highschool education facility that includes the steps of: (a) providing a computer-implemented, customizable student-access graphical user interface accessible by at least one of a group consisting of a student of a post-highschool education facility, a prospective student of the post-highschool education facility, a parent of a student of the post-highschool education facility, and a parent of a prospective student of the post-highschool education facility; (b) providing a computer-implemented school-access graphical user interface accessible by a representative of the post-highschool education facility; (c) the school-access graphical user interface prompting the representative of the post-highschool education facility for content and operation entries; and (d) customizing the student-access graphical user interface with the content and operation entries given by the representative of the post-highschool education facility.

Preferably, the method further includes the step of storing the content and operation entries given by the representative of the post-highschool education facility in a record associated with the post-highschool education facility in a database, where the customizing step includes a step of accessing the stored content and operation entries from the record associated with the post-highschool education facility. It is also preferred that the method include the step of accessing the school-access graphical user interface by a plurality of representatives from a respective plurality of post-highschool education facilities, where the prompting and customizing steps are performed for each of the plurality of post-highschool education facilities.

Preferably, the student-access graphical user interface is accessible as a Web-site on the Internet and the school-access graphical user interface is accessible as a Web-site on the Internet. It is also preferred that the school-access graphical user interface includes at least one field for customizing the operation of an electronic newsletter service, a financial-aid education service, a financial-aid qualification service, a financial-aid award notification service, a financial-aid product information service, a financial-aid provider information service, or a database record-keeping and reporting service.

Accordingly, it is an object of the present invention to provide a system for administering an on-line financial-aid service for a plurality of post-highschool education facilities; it is a further object that the system is relatively simple and inexpensive for the post-highschool education facilities to administer; it is an object of the present invention to provide a relatively seamless transition between the post-highschool education facilities' Web-sites and the system of the present invention; and it is an object of the present invention that the customizations give the appearance that the system of the present invention is associated with or provided by each of the post-highschool education facilities. It is to be understood, however, that it is not necessary to meet any or all of the stated advantages or objects of the present invention disclosed herein in order to fall within the scope of any claims, since the invention is defined by the claims and since inherent and/or unforeseen advantages of the present invention may exist even though they may not be explicitly discussed herein.

DETAILED DESCRIPTION

As shown in FIG. 1, the present invention provides a novel software device 20 operating on a centralized computer server 22 that is operatively coupled to a plurality of school computers or computer servers 24 over a computer network such as the Internet 26. Also coupled to the computer Internet are a plurality of user computers or terminals 28 belonging to prospective students, existing students, or parents of prospective or existing students of the schools. Each of the school computer servers or computers 24 typically include software (typically comprising of, or generating a graphical user interface of HTML code) providing a Website for the particular school that is accessible by computers (such as user computers 28) connected to the Internet using a conventional graphical display program (such as an Internet browser commercially available as Netscape Navigator or Microsoft Explorer). Such a Website will typically provide vast amounts of information about the school and the students of the school. The software device 20 operating on the centralized computer server 22 essentially includes two functional modules, providing two primary modes of access over the Internet: (a) a setup, maintenance and reporting module 30, providing a school-view access, where the representatives of the schools (such as financial-aid offers) can access of the software device 20; and (b) and information and service module 32, providing a student-view access, where the students can access a customized financial-aid information and services of the software device 20.

Generally, the software device 20 provides a plurality of generic HTML-based templates, which can be used to create customized financial-aid information/service Web-pages for any school registering with the provider of the software device 20. In the exemplary embodiment, the setup, maintenance and reporting module 30 is designed to allow the school representative to setup and customize the financial-aid information/service Web-pages on their own (using an Internet browser) by connecting to the Web-site access to the setup, maintenance and reporting module 30 and then setting up an "account," or database record, for the representative school in the database 36. Once the account is set up, the module 30 provides the school representative with Web-pages 34 that include HTML forms and links, which the representative will use to provide information regarding the representative school and used to select custom content and processes for the school's customized financial-aid information and services. The custom content and process selections entered/selected by the school's representative are stored in the database record assigned to the representative school. After custom content and process selections have been entered/selected by the school's representative, one of the modules 30, 32 will modify copies of the generic templates with the custom content and process selections entered/selected by the school representative and create exclusive Web-pages 38 for the information and service module 32 providing access to potential or existing students of the school and/or their parents. The school representative is provided with Internet addresses for the exclusive Web-pages 38, which can be used to create hyperlinks on the Website of the school resident on the school computer servers or computers 24.

In the exemplary embodiment, the provider of the software product 20 is a financial institution providing financial-aid products to students. The provider allows the schools to utilize the software product 20 for no charge, or for a substantially below-market charge, as an incentive for the schools to utilize the software product 20. In exchange, the provider develops a relationship with the schools utilizing the software product. Additionally, if exclusive Web-pages include information, qualification or acquisition services for specific financial-aid products, the provider will be able to pre-load the exclusive Web-sites with information, qualification and/or acquisition content pertaining to its own financial-aid products—providing a unique vehicle to introduce the provider's financial-aid products/services to the prospective or existing students of the school and/or their parents.

Examples of the financial-aid information and services that can be provided in the exclusive Web-pages 38 for each school include: (a) a newsletter service (electronic or otherwise), providing periodic financial-aid newsletters from the schools to the prospective or existing students of the school and/or their parents; (b) a counseling service providing required training sessions (as is typically required by the governmental agencies who often subsidize financial-aid products) to prospective or existing students of the school and/or their parents; (c) a financial-aid qualification or pre-qualification service that allows prospective or existing students of the school and/or their parents to apply for qualification or pre-qualification for certain financial-aid products; (d) a financial-aid award notification service providing the school with automated electronic (or otherwise) financial-aid award notification tools from which the school has the capability of easily notifying prospective or existing students of the school and/or their parents that they have been awarded or qualify for financial-aid; (e) a financial-aid provider information/selection service that allows prospective or existing students of the school and/or their parents to review and compare information regarding financial-aid products/services from a plurality of providers, and even select specific financial-aid products/services; and (f) a database record-keeping and reporting service that allows schools to access, download and review data, collected by the software device 20, concerning activities conducted by prospective or existing students of the school and/or their parents on the exclusive Web-pages 38 for the school. The above list is only an exemplary list of financial-aid information and services that can be provided by the exclusive Web-pages 38 and the software product 20; and it is within the scope of the invention that other types of information and services may be provided by the exclusive Web-pages 38 and/or software product 20, as will be apparent to those of ordinary skill in the art.

The following is a description of an exemplary embodiment of the software product 20, providing examples Web-pages 34 that include HTML forms and links from which a school representative will use to provide information regarding the representative school and to select custom content and processes for the school's customized financial-aid information and services, and also providing examples Web-pages 38, customized by the school representative, for access by potential or existing students of the school and/or their parents to obtain financial-aid information and/or services from the representative school. It is to be understood that the description of the exemplary Web-pages contained herein are is intended to limit the invention to any precise forms, but to provide examples of the broad range of forms in which the present invention may be embodied.

Figure 2:
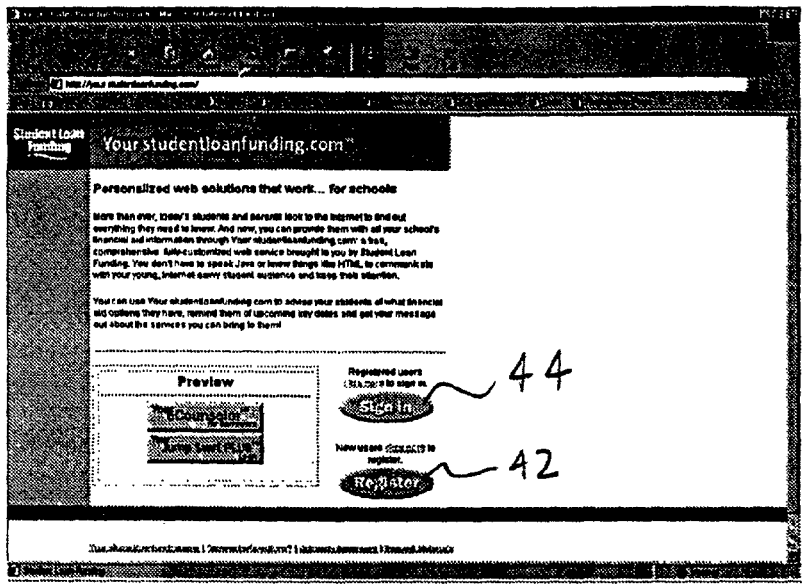
Figure 3:
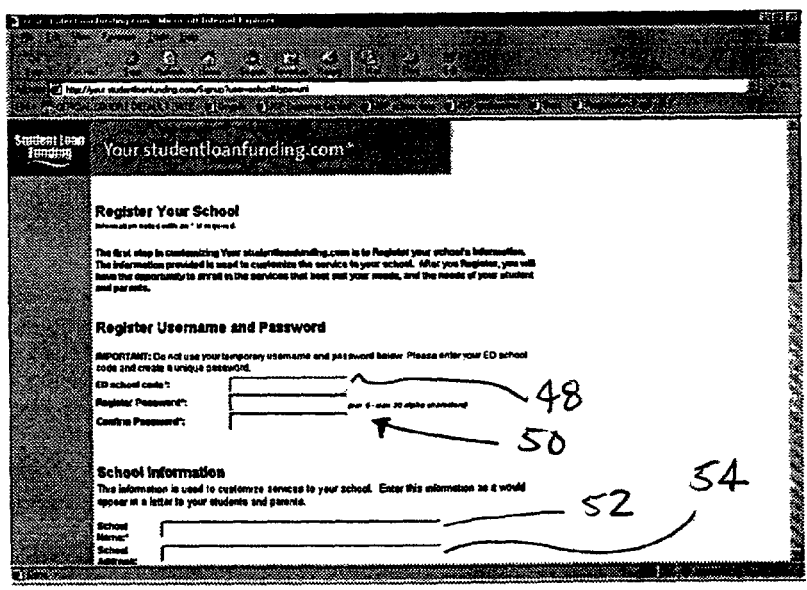

FIGS. 2-4, provide examples of Web-pages 34 provided by the school-access setup, maintenance and reporting module 30 for allowing the school's representative set up an account for the representative school or access an existing account setup for the representative school. FIG. 2 illustrates an example "home" page 40 including a "Register" icon or button 42 (activated, for example, as is known by those of ordinary skill, by placing a cursor or pointer over the image of the icon or button on the user's computer screen and then hitting/activating a physical switch/key/button/sensor on an input device to the computer, such as an "Enter" key on a keyboard or a button on a mouse). The "Register" button 42 is to be activated by a school representative for a school that has not yet set up an account with the software device 20. The home page 40 also includes a "Sign In" button 44 to be activated by the school representative for a school already having an account with the software device. If the "Sign In" button is activated, then a username/password window will be displayed, requiring the school representative to enter a correct username and password before allowing the school representative to advance to the main menu page 46 (FIG. 4, described below). If the "Register" button is activated, the "Register Your School" page 47 will be displayed as shown in FIG. 3. In the exemplary embodiment, however, the school representative will be required to enter a temporary username and password, which is given to the school representative by the provider of the software device, before advancing to the "Register Your School" page 47. This will keep those parties that are not proper representatives of the school from setting up a bogus account for the school.

The "Register Your School" page 47, in the exemplary embodiment, includes graphical fields, menus and the like that allow the school representative to enter/select the following information: (a) the school's 6-digit DOE code in field 48, (b) the school's password in field 50, (c) the school's name in field 52, (d) the school's address in field 54, (e) the school's phone number (field not shown), (f) the school's logo, such as a bitmap image entered, for example, by cutting and pasting an image of the logo onto the proper field (not shown) of the page 46, (g) the school type (i.e., four-year state university, four-year private university, junior college, etc.) selected from a menu (not shown), (h) the school color or colors selected from a menu (not shown), (i) a primary contact name and e-mail (fields not shown), and (j) a technical contact name, title, e-mail and phone number (fields not shown). Once successfully registered, the main menu page will be displayed as illustrated in FIG. 4.

The main menu page, which may display the school colors, school name 56 and school logo entered/selected in the "Register Your School" page 47, preferably provides a menu 58 of various information/services that have already been registered for by the school and a menu 60 of various information/services that still need to be registered by the school. The menu 60 of various information/services that still needs to be registered by the school in this exemplary Web page includes a newsletter service selector 62, a financial-aid award notice service selector 64, a financial-aid product pre-qualification service selector 66 and a financial-aid counseling service selector 68. Preferably, the software device 20 is capable of determining or limiting the types of information/services that are available to a school based upon the type of school or upon other factors.

FIGS. 6-11 illustrate example Web-pages provided by the school-access setup, maintenance and reporting module 30 for allowing the school's representative set up an electronic (e-mail) financial-aid newsletter for the representative school. If the newsletter service selector 62 is activated by the representative in the main menu page 47 and if the school is already enrolled for the electronic newsletter service, a newsletter enrollment and setup page 70 is displayed, as illustrated in FIG. 5. If not enrolled for the electronic newsletter service, the enrollment page 72 is displayed, as illustrated in FIG. 6.

As shown in FIG. 5, the newsletter enrollment and setup page 70 includes a menu that provides a selector 74 to allow the representative to modify enrollment information, a selector 76 to allow the representative to add or modify subscriber information, a selector 78 to allow the representative to create, customize and/or preview newsletters, and a selector 80 to allow the representative to view subscriber reports.

Once advancing to the enrollment page 72 as shown in FIG. 6, the representative is capable of initially enrolling the school for the electronic newsletter service, or modifying the enrollment information if the school has already been enrolled.

In the exemplary embodiment, the enrollment page 72 for the electronic newsletter service includes a field 82 for entering the first name, last name, title, phone number and email address of a contact for the representative school (which may be the representative himself or herself). The next field 84 requires the representative to enter an Internet address (such as a URL) to where students will be directed upon completing the subscription process for the electronic newsletter. Preferably, the Internet address provided is the URL for the Website of representative school. The next field 86 allows the representative to enter email addresses of individuals of the school who should receive notices of available electronic newsletters and copies of the newsletters that are sent to the students by the software product 20. The enrollment page 72 also includes a hyperlink 88 that will take the representative to another Webpage from which the representative will be able to incorporate a hyperlink (Internet address) on the representative school's Website so that students can be taken to the exclusive Webpages 38 created by the software device 20 after the electronic newsletter service has been established by the schools representative. Finally, the enrollment page 72 also includes a button 90 to direct the enrollment page 72 to submit the enrollment information provided by the representative in the above fields and to download the information provided to an appropriate database record in the database 36.

Figure 7:

If, in the setup page 70, the representative activates the selector 76, indicating that the representative wishes to add or modify subscriber information, the representative may eventually be taken to a page 92, as shown in FIG. 7, on which the representative is capable of adding a subscriber to the electronic newsletter service. The page 92 includes fields 94 for entering the new subscriber's first name, last name, email and zip code; a field 96 which the representative can indicate whether the subscriber is a student or a parent; and a field 98 in which the representative can select the subscriber's grade level. Finally, the page also includes a button 100 which, upon activation, the information entered above will be downloaded to an appropriate database record in the database 36.

If the representative selects, in the newsletter enrollment and setup page 70, the selector 78 that allows the representative to create, customize and/or preview the newsletters, the representative may be taken to a page 102, shown in FIG. 8. This page 102 provides a plurality of newsletters for which the representative can customize the content or distribution operations. The page 102 includes a plurality of fields arranged in columns: a delivery date column 104, a newsletter subject column 106, and a newsletter status column 108. The newsletter subject column 106 includes the title of each electronic newsletter that may be sent by the program 20, where the title is a selector 110 by which the representative can be directed to a page 111 (see FIG. 9) that allows the representative to customize the content and distribution operation of the particular newsletter selected. The newsletter status column 108 provides a plurality of fields 112 that the representative can activate to direct whether the newsletter will be sent to the selected recipients on the stated delivery date or whether the newsletter will not be sent at all.

As shown in FIG. 9, if the representative wishes to customize the content and distribution operations of a particular newsletter, the representative will be taken to the Webpage 111. The Webpage 111 includes a field 114 that allows the representative to modify or type-in a newsletter subject for the newsletter; a field 116 that allows the representative to indicate what recipients are to receive this electronic newsletter (in the exemplary embodiment, the representative can select between college freshmen and/or college sophmores); and a field 118 into the which the representative can enter customized text that would appear within the newsletter. The Webpage 111 also identifies the delivery date 120 for the newsletter and static newsletter content 122. Finally, the Webpage 111 includes a button 124 that the representative can activate that will direct the customizations made above to be stored in the appropriate database record in the database 36.

In the exemplary embodiment, once the button 124 is selected, indicating that the representative wishes to store the customizations made within the Webpage 111, the program 20 will display a Webpage 126, as shown in FIG. 10, which displays for the representative how the customized newsletter will appear to the recipients. As shown in FIG. 10, the Webpage 126 shows that the subject was customized to read "cool stuff you should know" and that the representative added the custom text "custom content."

If, in the setup page 70, the representative activates the selector 80 indicating that the representative wishes to review subscriber reports, the program 20 will be able to compile various reports for the representative based upon subscriber and newsletter information stored in the database record associated with the representative school. This data can be formulated to be displayed on a Webpage or to be downloaded for viewing or processing by the school. FIG. 11 provides an example Website 128 illustrating a report that displays the number of newsletter subscribers by grade level.

FIGS. 12-14 illustrate example Webpages provided by the school-access setup, maintenance and reporting module 30 for allowing the school's representative to setup a financial-aid counseling service for the representative school. If the financial-aid counseling services selector 68 is activated by the representative in the main menu page 47 and if the school is not enrolled for the counseling service, the enrollment page 130 is displayed, as illustrated in FIG. 12.

The financial-aid counselor enrollment page 130 will include a field 132 into which the representative can enter contact information for the individual who will be managing the financial-aid counseling service. The next field 134 is for the representative to provide an Internet address directing the program 20 where to direct Internet browsers after they have completed a counseling session. Field 136 allows the representative to select how the school will be notified that a student had successfully completed a counseling session. Such selections include: (a) adding the student's name to an electronic roster stored on the database 36, (b) requiring the students to print out a certificate at their computer which will be submitted to the school, (c) notification to the school by email, or (d) a combination of any or all of the above. Other fields provided by the Website 130 include a field 138 to indicate if the school participates in a certain loan program or programs, a field 140 where the representative can direct the students where to send paper certificates of counseling session completion; a field 142 where the representative will provide an email address to which email notification of student's counseling session completions will be sent.

FIG. 13 provides an additional financial-aid counselor enrollment Website 144 this page 144 includes a field 146 from which the representative can select the testing procedure to test whether students have adequately reviewed the required financial-aid counseling materials. This field can indicate, for example, that the test are to be administered at the end of the counseling session, during the counseling session or not at all. This Webpage 144 also includes a button 148 that the representative will activate to direct the program 20 that all of the customizations entered on Webpage 130 and 144 are to be utilized for that school. Such customizations selected/or entered by the representative will be stored in the appropriate database record in the database 36.

FIG. 14 provides an example of a Website 146 that allows the representative to customize specific counseling information accessible by the students during counseling sessions. This page 146 will include a field 148 into which the representative can enter customized text for the particular counseling session and a field 150 that allows the representative to specify where the customized text is to appear within the static information for the counseling session. The page 146 will also include a button 152 that the representative will activate once satisfied with the customizations made above. Once the button 152 is activated, the program 20 will store the customizations in the appropriate database field in the database 36.

Figure 15:
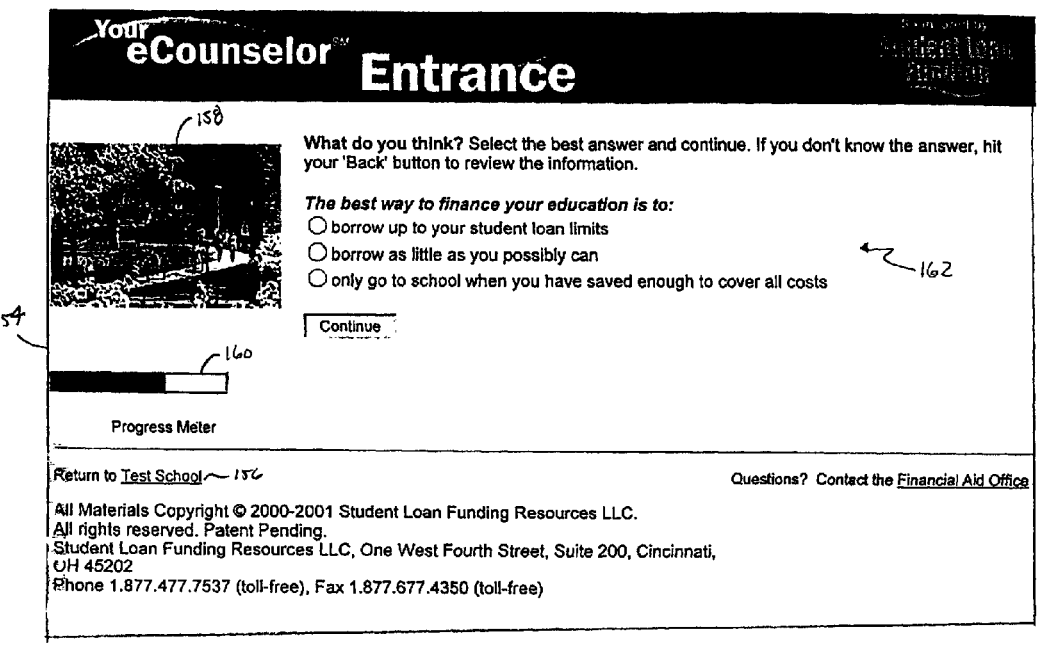

FIG. 15 illustrates an example Webpage provided by the student-access information and service module 32 that allows students to access and review required financial-aid counseling information over the Internet. This page 154 preferably displays the school colors, school name 156 and school logo 158 entered/selected in the "register your school" page 47 by the school representative. The page 154 also preferably includes a "progress meter" graphic 160 that illustrates to the student how much of the counseling program the student has satisfied to that point. In the present example Webpage 154, a test question 162 is illustrated to test the student's knowledge of the financial-aid counseling information reviewed previously. The program 20 is designed to provide such a test to the students to certify that the students have adequately reviewed the financial-aid education materials. The program 20 is also configured to provide notification to the students' schools to inform the schools whether or not the students have passed or failed the test. The test results may also be stored in the database 36, which is accessible by the appropriate school representative for download or review.

FIG. 16 illustrates an example Webpage 164 provided by the school-access setup, maintenance and reporting module 30 for allowing the school's representative to setup a loan pre-approval enrollment application for prospective borrowers to access and fill-out via the student-access information and service module 32. This Webpage 164 includes a field 166 for the representative to enter the relevant information for a contact person at the school; a field 168 from which the representative can select a preferred guarantor or originator; a field 170 where the representative can provide a computer network address where the student-access information and service module 32 will route the borrowers when the pre-approval form has been filled out; a field 172 from which the representative can select the operation for notifying the prospective borrowers of their approval or denial status; and a field 174 from which the representative can select a desired application/certification processing method. The first processing method directs the program 20 to sent the prospective borrower a pre-printed application with instructions to complete, sign and return to the preferred guarantor/originator once the prospective borrower has filled out the on-line application. From there, the school will certify the loan electronically. The next selectable processing method directs the program to inform the prospective borrower via electronic notification that the school will initiate the application process, where the school will send the preferred guarantor/originator the application information entered by the prospective borrower during the online application process. From there, the school will certify the loan electronically, while the guarantor/originator will mail a preprinted loan application to the prospective borrower for their review and signature. The last processing option requires that the program 20 send the prospective borrower a preprinted application with instructions to complete, sign and return the application to the school. The school will certify the loan and then forward the paper application to the preferred guarantor/originator for additional process.

Figure 18:
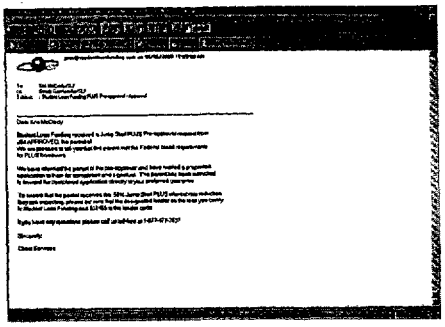
Figure 19:
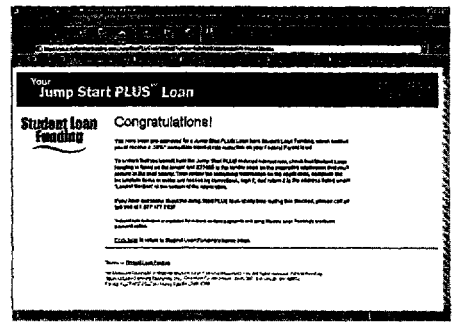
Figure 17:
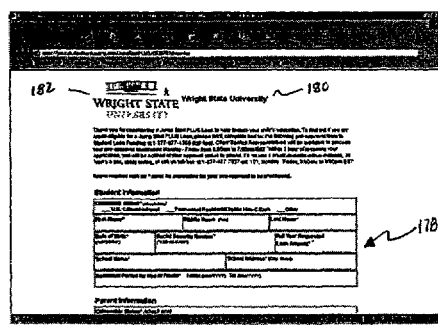

FIG. 17 provides an example Website 176 provided by the student-access information and service module 32 for allowing a prospective borrower to fill out an online application form 178. Note that this Website 176 preferably includes school colors, a school name 180 and school logo 182 entered/selected in the "register your school" page 47 by the school representative during the registration process described above. FIG. 18 provides an example email notification to the prospective borrower indicating that the prospective borrower has been approved for the loan and FIG. 19 provides an example Webpage provided by the student-access information and service module 32 that indicates the prospective borrower has been pre-approved for the loan applied for in the Webpage 176.

FIGS. 20-21B illustrate example Webpages provided by the school-access setup, maintenance and reporting module 30 for allowing the school's representative to set up a financial-aid award notice service for the representative school. If the financial-aid award notice service selector was activated by the representative in the main menu page 47 the enrollment page 184 will be displayed as illustrated in FIG. 20 for the representative to complete. The enrollment page 184 includes a field 186 into which the representative can enter the necessary contact information for the individual of the school who will be managing the electronic award service; a field 188 into which the representative can provide an email for students to use for award questions; a field 190 asking the representative whether or not a student should be sent and email reminder if the student had not accessed their electronic award; a field 192 from which the representative can select how many days should pass between the electronic award and the above reminder if the above reminder is selected; a field 194 into which the representative can provide a network address for students to access the Website of the school from the award notification; a field 196 asking the representative whether or not a link should be provided on the award notification to a Stafford Loan Application if the student is awarded a Stafford loan; and a filed 198 asking whether or not the representative wishes a link to be provided to an online PLUS pre-approval application if the student is awarded a federal PLUS loan in the award statement. Finally, a button 200 is provided for activation by representative when the above fields have been entered in and/or selected.

Figure 21A:
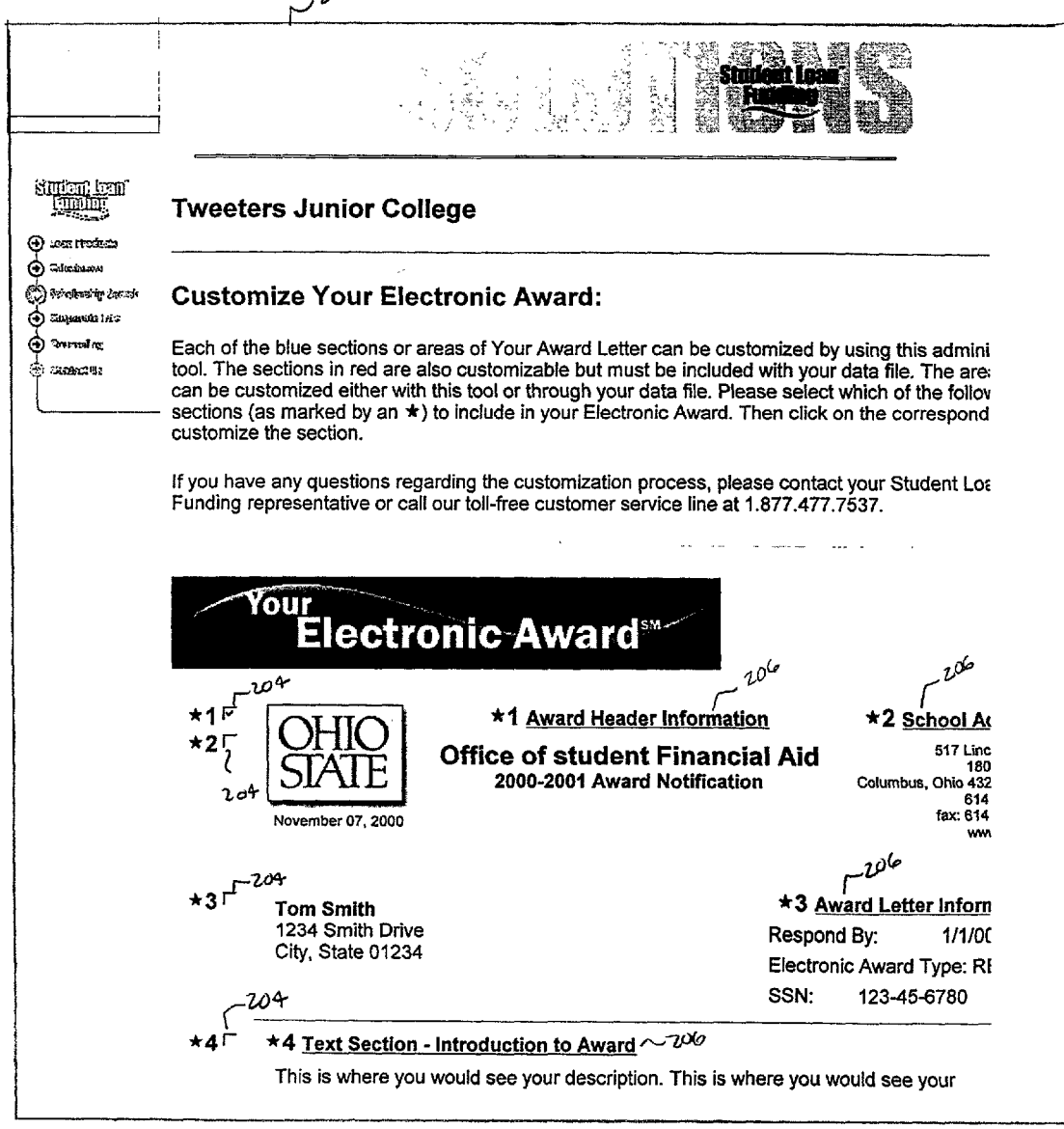

FIGS. 21A and 21B illustrate an example Webpage provided by the school-access setup, maintenance and reporting module for allowing the schools representative to customize the look and feel of an electronic award notification that will be either transmitted to the student by email or made available to the student for access on the centralized computer server 22. The Webpage 202 includes a plurality of boxes 204 for activation or for selection or deselection by the representative. Each box pertains to a specific portion of the electronic award notification. For example, box 1 pertains to the reward header information, box 2 pertains to the school address, box 3 pertains to the award letter information, box 4 pertains to the introduction text to the award, etc. If the box 204 is activated, then the award notification will include this section and if the box is not activated then the electronic award will not include the associated section. Additionally, each section includes a selector or hyperlink 206 that will take the school representative to a Webpage for modifying the content, look and feel of the information provided by the particular section.

Figure 22:
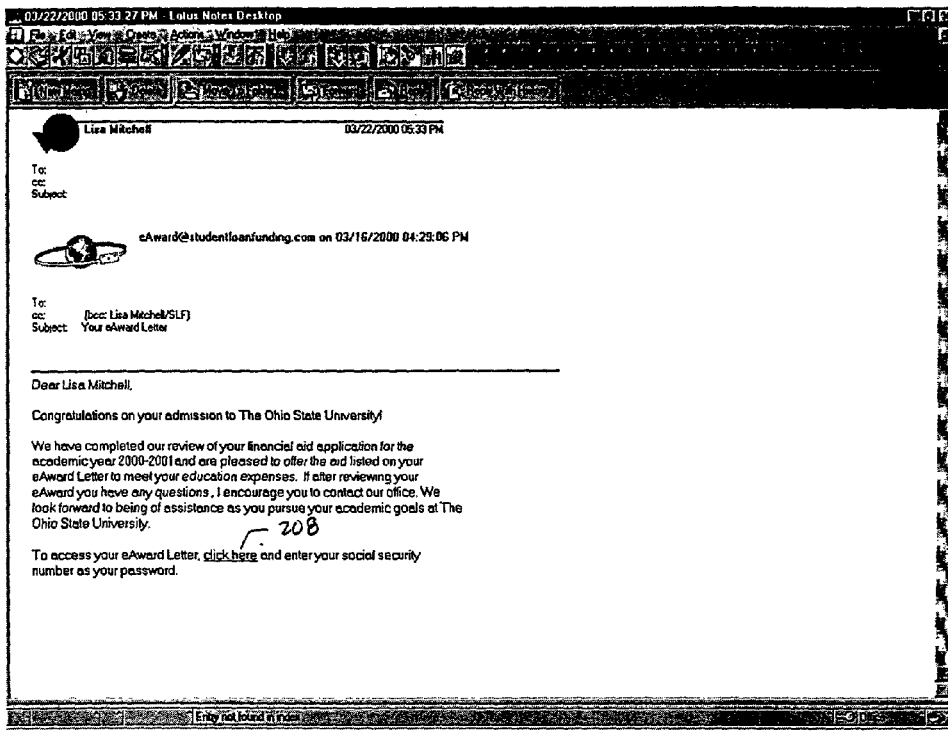

FIG. 22 provides an example email notice 206 from the centralized computer server to the user computer 28 indicating to the user that the student's financial-aid application has been reviewed and the financial-aid provided is listed on an electronic award letter, which is located on the centralized computer server and accessible by the student activating the hyperlink 208.

Figure 23:
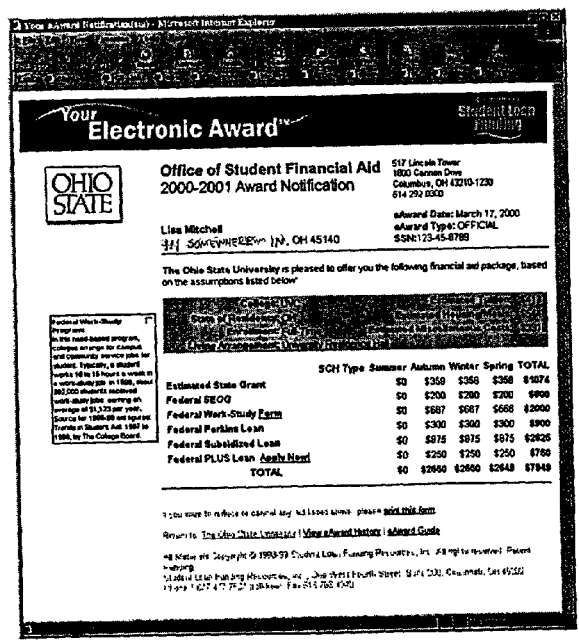

FIG. 23 provides and example Webpage 210 illustrating the student's electronic awards notification information in a format as specified by the school representative who completed the customization form provided in the Website 202 (FIGS. 21A and 21B, described above).

Following from the above description and summaries, it should be apparent to those of ordinary skill in the art that, while the apparatuses and processes herein described constitute exemplary embodiments of the present invention, it is to be understood that the invention is not limited to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims.

What is claimed is:

1. A system for administering an on-line financial-aid service for a plurality of post-highschool education facilities, comprising:
   a centralized computer server operatively coupled to a computer network;
   a plurality of school computer servers for a plurality of post-highschool education facilities operatively coupled to the computer network; and
   at least one user computer operatively coupled to the computer network, the user computer being a computer of a borrower taken from a group consisting of a prospective student, an existing student, a parent of a prospective student and a parent of an existing student;

each school computer server including a Web-site software program providing a graphical user interface representing a Web-site for the respective post-highschool education facility on the computer network, the Web-site graphical user interface including an address link for connecting the user computer to the centralized computer server;

the centralized computer server including a financial-aid-service software program providing a school-access graphical user interface accessible by each of the post-highschool education facilities and a student-access customizable graphical user interface for each of the post-highschool education facilities, accessible by the borrower;

the school-access graphical user interface enabling a given post-highschool education facility to establish an account that causes the financial-aid-service software program to enable customization of the corresponding student-access graphical user interface for the given post-highschool education facility by providing at least one computer-based form including entry and/or selection fields for enabling a representative of the given post-highschool education facility to customize the content and operation of the corresponding student-access graphical user interface for the given post-highschool education facility; and each student-access graphical user interface providing at least financial-aid information to the borrower.

2. The system of claim 1, wherein the student-access graphical user interface provides financial-aid services to the borrower in addition to the financial-aid information.

3. The system of claim 2, wherein the financial-aid information and services provided by the student-access graphical user interface includes federally required financial-aid education information.

4. The system of claim 3, wherein the student-access graphical user interface includes a monitor program determining whether the borrower has accessed the federally required financial-aid information.

5. The system of claim 4, wherein the monitor program is programmed to provide data to the corresponding post-highschool education facility concerning the borrower's access to the federally required financial-aid information.

6. The system of claim 5, wherein the monitor program includes a test for testing the borrower's knowledge of the federally required financial-aid information and the monitor program is programmed to notify the corresponding post-highschool education facility of the borrower's test results.

7. The system of claim 6, wherein the form provided by the school-access graphical user interface includes a field to allow the operation of the test to be selected.

8. The system of claim 1, wherein the financial-aid information provided by the student-access graphical user interface includes information pertaining to financial-aid products.

9. The system of claim 8, wherein the financial-aid-service software program is provided by a proprietor of financial-aid products, and the information pertaining to financial-aid products is preloaded with information pertaining to the financial-aid products of the proprietor.

10. The system of claim 1, wherein the form provided by the school-access graphical user interface includes a field to allow each post-highschool education facility to enter a school color and an image pertaining to the school, and the student-access graphical user interface including the school color and image to project to the borrower an association the post-highschool education facility.

11. The system of claim 1, wherein the school access graphical user interface includes at least one field for customizing the operation of at least one of a group consisting of an electronic newsletter service, a required student training service, a financial-aid qualification service, a financial-aid award notification service, a financial-aid product information service, a financial-aid provider information service, and a database record-keeping and reporting service.

12. The system of claim 1, wherein the school access graphical user interface includes at least one field for customizing the operation of a financial-aid award notification service.

13. The system of claim 1, further comprising a database accessible by the centralized computer server, wherein the financial-aid-service software program is programmed to create a record for each post-highschool education facility that registers with the school-access graphical user interface, the record containing customized content and operation selections made by the post-highschool education facility.

14. The system of claim 13, wherein the student-access graphical user interface draws from the record for the post-highschool education facility to provide financial-aid information to the borrower in a format and operation specified, at least in part, by the customized content and operation selections made by the post-highschool education facility registered with the school-access graphical user interface.

15. The system of claim 14, wherein the financial-aid-service software program is further programmed to store data regarding actions taken by borrowers interfacing with the student-access graphical user interface.

16. The system of claim 15, wherein the financial-aid-service software program is further programmed to formulate reports for the post-highschool education facility registered with the school-access graphical user interface from the data regarding actions taken by borrowers interfacing with the student-access graphical user interface.

17. The system of claim 13, wherein the financial-aid-service software program includes a plurality of customizable template modules for the student-access graphical user interface, the template modules being customized with the customized content and operation selections made by the post-highschool education facility registered with the school-access graphical user interface.

18. The system of claim 1 wherein the school access graphical user interface includes at least one field for customizing the operation of an electronic newsletter service, at least one field for customizing the operation of a required student training service, at least one field for customizing the operation of a financial-aid qualification service and at least one field for customizing the operation of a financial-aid award notification service.

19. A method for administering a financial-aid service to a post-highschool education facility, comprising the steps of:

providing a computer-implemented, customizable student-access graphical user interface accessible by at least one of a group consisting of a student of a post-highschool education facility, a prospective student of the post-highschool education facility, a parent of a student of the post-highschool education facility, and a parent of a prospective student of the post-highschool education facility;

providing a computer-implemented school-access graphical user interface accessible by a representative of the post-highschool education facility enabling the post-highshcool education facility to establish an account that facilitates customization of the student-access graphical user interface for the post-highshcool education facility;

the school-access graphical user interface prompting the representative of the post-highschool education facility for content and operation entries that, when entered by the representative, will be used for customization of the student-access graphical user interface for the post-highshcool education facility; and customizing the student-access graphical user interface with the content and operation entries given by the representative of the post-highschool education facility.

20. The method of claim 19, further comprising the steps of storing the content and operation entries given by the representative of the post-highschool education facility in a record associated with the post-highschool education facility in a database, wherein the customizing step includes a step of accessing the stored content and operation entries from the record associated with the post-highschool education facility.

21. The method of claim 20, further comprising the step of accessing the school-access graphical user interface by a plurality of representatives from a respective plurality of post-highschool education facilities, wherein the prompting and customizing steps are performed for each of the plurality of post-highschool education facilities.

22. The method of claim 21, wherein:
the student-access graphical user interface is accessible as a Web-site on the Internet; and
the school-access graphical user interface is accessible as a Web-site on the Internet.

23. The method of claim 22, wherein the school-access graphical user interface includes at least one field for customizing the operation of at least one of a group consisting of an electronic newsletter service, a financial-aid education service, a financial-aid qualification service, a financial-aid award notification service, a financial-aid product information service, a financial-aid provider information service, and a database record-keeping and reporting service.

24. The method of claim 19, further comprising the step of providing at least one financial-aid service by the student-access graphical user interface.

25. The method of claim 24, wherein the financial-aid service is taken from a group consisting of a financial-aid education service, a financial-aid qualification service, a financial-aid award notification service, a financial-aid product information service, and a financial-aid provider information service.

26. The method of claim 22, wherein the financial-aid service is a financial-aid education service, and the student-access graphical user interface performs the step of displaying financial-aid education information to an individual accessing the service and testing the individual's knowledge of the displayed financial-aid information.

27. The method of claim 26, wherein the stored content and operation entries from the record associated with the post-highschool education facility include operation entries dictating an operation of the testing step.

28. The method of claim 27, wherein the individual is one of a student and a prospective student of a post-highschool education facility and the method further includes the step of notifying the individual's post-highschool education facility of results from the testing step.

29. The method of claim 28, further comprising the step of providing a display by the student-access graphical user interface indicating the individual's relative progress in the financial-aid education service.

30. The method of claim 24, wherein:
the financial-aid service is at least one of a financial-aid product information service and a financial-aid product application service;
the student-access graphical user interface and the school-access graphical user interface are provided by a proprietor of a financial-aid product; and
the method further includes the step of preloading the financial-aid service with information about the proprietor's financial-aid product.

31. The method of claim 19, wherein the content and operation entries given by the representative of the post-highschool education facility include a school color and a school logo.

* * * * *

UNITED STATES PATENT AND TRADEMARK OFFICE
CERTIFICATE OF CORRECTION

PATENT NO. : 7,398,235 B1
APPLICATION NO. : 09/711671
DATED : July 8, 2008
INVENTOR(S) : Greg S. Westrick It is certified that error appears in the above-identified patent and that said Letters Patent is hereby corrected as shown below:

Claim 26, Col. 14, Line 7

"The method of claim 22" should be -- The method of claim 24 --

Signed and Sealed this

Twenty-eighth Day of October, 2008

JON W. DUDAS
*Director of the United States Patent and Trademark Office*